(12) United States Patent
Kwon et al.

(10) Patent No.: US 8,099,051 B2
(45) Date of Patent: Jan. 17, 2012

(54) PILOT SIGNAL POWER CONTROL APPARATUS AND OPERATION METHOD OF PILOT SIGNAL POWER CONTROL APPARATUS

(75) Inventors: Tae Soo Kwon, Gyeonggi-do (KR); In Sun Lee, Gyeonggi-do (KR); Hyo Sun Hwang, Seoul (KR); Youngsoo Kim, Seoul (KR); Hyun Ho Choi, Gyeonggi-do (KR); Young Hoon Lee, Daejeon (KR); Young Chul Sung, Daejeon (KR); Hee Jung Yu, Daejeon (KR); Young Seok Oh, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 994 days.

(21) Appl. No.: 12/038,995

(22) Filed: Feb. 28, 2008

(65) Prior Publication Data

US 2009/0124206 A1    May 14, 2009

(30) Foreign Application Priority Data

Nov. 12, 2007    (KR) .................. 10-2007-0114996

(51) Int. Cl.
*H04B 1/00* (2006.01)
*H04B 15/00* (2006.01)
*H04B 17/00* (2006.01)

(52) U.S. Cl. .................. 455/63.1; 455/67.11; 455/67.13

(58) Field of Classification Search .................. 455/63.1, 455/67.11, 67.13, 422.1, 423, 570, 574, 522, 455/127.1, 127.5, 29, 6, 298, 13.4
See application file for complete search history.

(56) References Cited

U.S. PATENT DOCUMENTS 6,289,004 B1 *   9/2001   Mesecher et al. ............. 370/286

FOREIGN PATENT DOCUMENTS

| EP | 1 750 466 A1 | 2/2007 |
|---|---|---|
| JP | 2006-319537 | 11/2006 |
| JP | 2007-53546 | 3/2007 |
| JP | 2007-88940 | 4/2007 |
| JP | KR 2007-48576 | 5/2007 |

* cited by examiner

*Primary Examiner* — Eugene Yun
(74) *Attorney, Agent, or Firm* — NSIP Law (57) ABSTRACT

A pilot signal power control apparatus to determine a power level of a pilot signal of a primary network to indicate an availability of a wireless resource of thereof to a secondary user of a secondary network according to a cognitive radio technology, the pilot signal power control apparatus and an operation method thereof, the pilot signal power control apparatus including: a prediction unit to predict a noise increase and/or a sensing probability, the noise increase occurring in a primary user of the primary network due to a channel estimation error, and the sensing probability being a probability that a secondary user senses the pilot signal of; a channel capacity calculation unit to calculate a channel capacity of the primary user based on the predicted noise increase and/or sensing probability; and a power level determination unit to determine the power level of the pilot signal using the calculated channel capacity.

15 Claims, 5 Drawing Sheets

PILOT SIGNAL POWER CONTROL APPARATUS AND OPERATION METHOD OF PILOT SIGNAL POWER CONTROL APPARATUS

CROSS-REFERENCE TO RELATED APPLICATION

This application claims the benefit of Korean Application No. 2007-114996, filed Nov. 12, 2007, in the Korean Intellectual Property Office, the disclosure of which is incorporated herein by reference.

BACKGROUND OF THE INVENTION

1. Field of the Invention

Aspects of the present invention relate to a cognitive radio technology, and more particularly, to a technology to control a pilot signal power.

2. Description of the Related Art

Currently, much research on technologies to efficiently use limited frequency resources has been conducted. Among these technologies, a cognitive radio (CR) technology reuses frequency resources to efficiently use the limited frequency resources. That is, according to the CR technology, a communication apparatus in a secondary network periodically or irregularly senses frequency resources that are not used in a primary network to recognize available frequency resources. Accordingly, the communication apparatus can receive and/or transmit a signal using the recognized available frequency resources. In this instance, however, the primary network has a priority with respect to the available frequency resources.

Furthermore, according to the CR technology, a transmitter of the primary network can transmit a data signal and a pilot signal. When power of the pilot signal is low, the secondary network may not recognize that the primary network is using the available frequency resources. Conversely, when the power of pilot signal is high, power of the data signal of the primary network may be low as a result.

When the primary network cannot recognize that the secondary network is using an available frequency resource, a signal of the primary network may collide with a signal of the secondary network. Moreover, when the power of the data signal of the primary network is insignificant or low, the primary network cannot increase a channel capacity. Accordingly, a technology to control power of a pilot signal is needed.

SUMMARY OF THE INVENTION

Aspects of the present invention provide a pilot signal power control apparatus and operation method thereof that estimates a noise increase occurring due to a channel estimation error, measures a channel capacity, determines a power level of a pilot signal using the calculated channel capacity, and thereby allocates a transmission power to the pilot signal in order to maximize the channel capacity.

Aspects of the present invention also provide a pilot signal power control apparatus and operation method thereof that estimates a sensing probability of a secondary user, calculates a channel capacity, and thereby determines an optimal power of the pilot signal based on the calculated channel capacity.

Aspects of the present invention also provide a pilot signal power control apparatus and operation method thereof that calculates a channel capacity according to a modulation coding scheme (MCS), determines an optimal power of the pilot signal based on the calculated channel capacity, and thereby improves a data transmission rate.

According to an aspect of the present invention, there is provided a pilot signal power control apparatus to determine a power level of a pilot signal of a primary network in order to indicate an availability of a wireless resource of the primary network to a secondary user of a secondary network according to a cognitive radio technology, the pilot signal power control apparatus including: a prediction unit to predict a noise increase and/or a sensing probability, the noise increase occurring in a primary user of the primary network due to a channel estimation error, and the sensing probability being a probability that a secondary user senses the pilot signal of the primary network; a channel capacity calculation unit to calculate a channel capacity of the primary user based on the predicted noise increase and/or the predicted sensing probability; and a power level determination unit to determine the power level of the pilot signal using the calculated channel capacity.

According to another aspect of the present invention, there is provided a method of determining a power level of a pilot signal of a primary network in order to indicate an availability of a wireless resource of the primary network to a secondary user of a secondary network according to a cognitive radio technology, the method including: predicting a noise increase and/or a sensing probability, the noise increase occurring in a primary user of the primary network due to a channel estimation error, and the sensing probability being a probability that a secondary user senses the pilot signal of the primary network; calculating a channel capacity of the primary user based on the predicted noise increase and/or the sensing probability; and determining the power level of the pilot signal using the calculated channel capacity.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
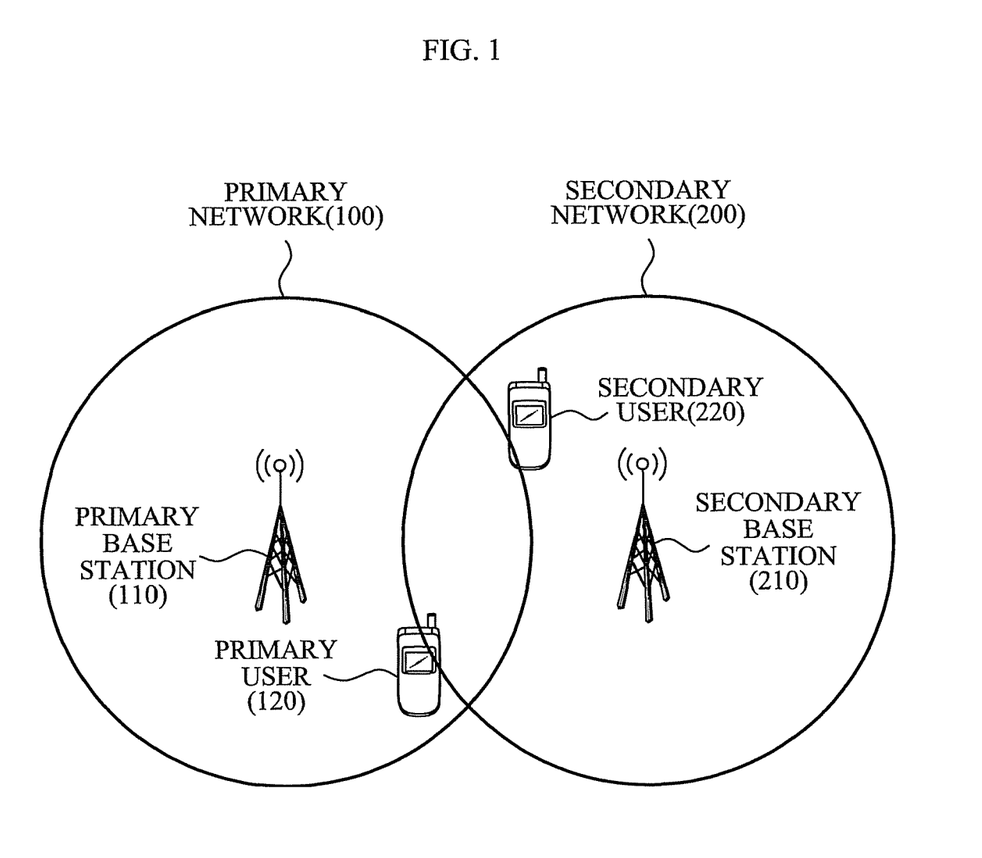
FIG. 1 illustrates a primary network and a secondary network according to an embodiment of the present invention.

FIG. 1 illustrates a primary network 100 and a secondary network 200 according to an embodiment of the present invention. Referring to FIG. 1, the primary network 100 includes a primary base station 110 and a primary user 120, and the secondary network includes a secondary base station 210 and a secondary user 220.

The primary network 100 uses a frequency resource allocated to the primary network 100 without considering whether the secondary base station 210 or the secondary terminal 220 receives and/or transmits a signal on the frequency resource. In this instance, the secondary base station 210 and/or the secondary terminal 220 may recognize all or a portion of the frequency resource allocated to the primary network as an available frequency resource using a cognitive radio (CR) technology. If the secondary base station 210 and/or the secondary terminal 220 recognize all or a portion of the frequency resource as available, the secondary base station 210 and/or the secondary terminal 220 can receive and/or transmit a signal using the recognized available frequency resource.

The signal transmitted from the secondary base station 210 and/or the secondary terminal 220 may be received by the primary terminal 120 or the primary base station 110, resulting in an interference. Accordingly, the primary terminal 120 and/or the primary base station 110 may not communicate normally due to the interference.

However, although the secondary base station 210 and/or the secondary terminal 220 uses the available frequency resource, the primary network generally has a priority of the available frequency resource. Accordingly, when the primary network 100 is using the available frequency resource, the secondary base station 210 and the secondary terminal 220 change frequencies or stop a communication operation. Thus, the secondary base station 210 and/or the secondary terminal 220 should sense the signal transmitted from the primary terminal 120 and/or the primary base station 110 in order to determine whether the primary network 100 is using the available frequency resource.

Figure 2:
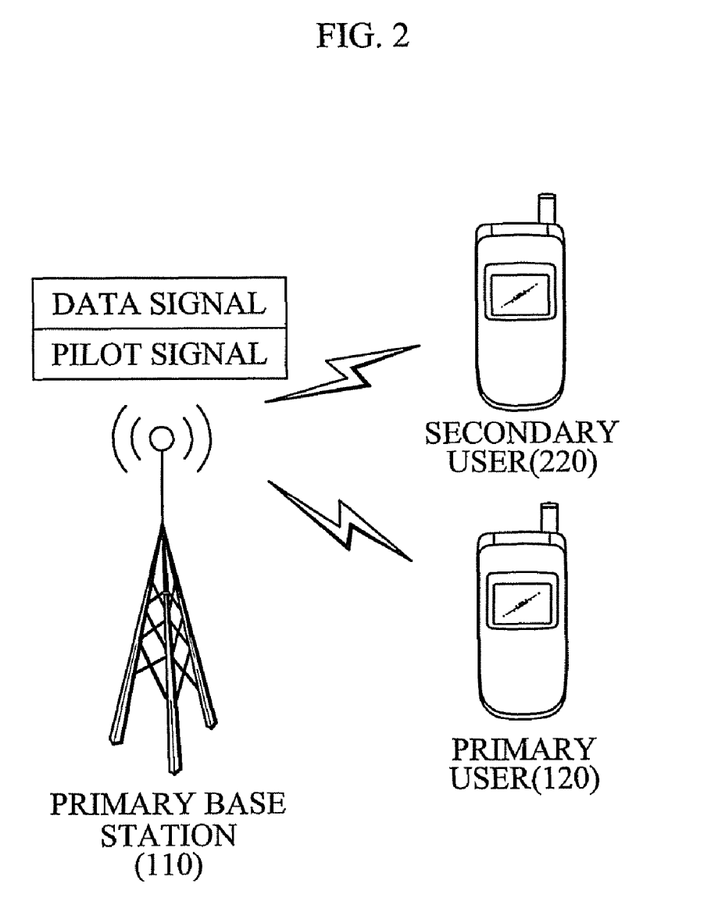
FIG. 2 illustrates a primary base station, a transmission signal of the primary base station, a primary user, and a secondary user according to an embodiment of the present invention.

FIG. 2 illustrates a primary base station 110, a transmission signal of the primary base station 110, a primary user 120, and a secondary user 220 according to an embodiment of the present invention. Referring to FIG. 2, the primary base station 110 transmits a data signal and a pilot signal. In this instance, power available to be allocated to the data signal and the pilot signal may be limited. That is, the primary base station 110 distributes the limited power between the data signal and the pilot signal.

Specifically, when the total power obtained by summing power of the data signal and power of the pilot signal is represented as $P_t$, the power of the pilot signal is $\alpha P_t$, and the power of the data signal is $(1-\alpha)P_t$, where $\alpha$ is greater than 0, and less than 1. Thus, as the power of the pilot signal increases, the power of the data signal decreases. Conversely, as the power of the pilot signal decreases, the power of the data signal increases.

Furthermore, as the power of the pilot signal decreases, a probability that the secondary user 220 senses the pilot signal decreases. When the secondary user 220 does not sense a pilot signal of the primary base station 110, the secondary user 210 may then use the frequency resource with the impression that the frequency resource is available. As a result, a channel capacity of the primary user 120 may decrease or be 0 due to a signal transmitted from the secondary user on the frequency resource.

Conversely, as the power of the pilot signal increases, a probability that the secondary user 220 senses the pilot signal increases. However, since the power of the data signal decreases as the power of the pilot signal increases, the channel capacity of the primary user 120 decreases as the power of the pilot signal increases.

For example, assuming that the channel capacity of the primary user 120 is 0, when the secondary user 220 cannot sense the pilot signal of the primary base station 110 and receives and/or transmits a signal using a wireless resource of the primary base station 110 and the primary user 120, the channel capacity of the primary user ($C_{primary}$) 120 can be calculated as Equation 1:

$$C_{primary} = P_d(\alpha P_t)B\log_2\left(1 + \frac{(1-\alpha)P_t}{N_0 + E_{ch\_est}(\alpha)}\right), \quad \text{[Equation 1]}$$

where $P_d(\alpha P_t)$ is a probability that the secondary user 220 senses the pilot signal when the power of the pilot signal is $\alpha P_t$, B is a bandwidth of the primary user 120, $N_0$ is Gaussian noise of the primary user 120, and $E_{ch\_est}(\alpha)$ is a noise increase due to a channel estimation error of the primary user 120 when the power of the pilot signal is $\alpha P_t$.

Using Equation 1, the primary user 120 can estimate a capacity of a channel connected to the primary base station 110 more accurately as the power of the pilot signal increases. Accordingly, noise increases occurring in the primary user 120 due to channel estimation errors decrease. Furthermore, because the noise increases due to the channel estimation errors decreases, the channel capacity of the primary user 120 increases.

Also, as the power of the pilot signal increases, the probability that the secondary user 220 senses the pilot signal increases, and the channel capacity increases. However, as $\alpha$ increases, the power of the data signal, $(1-\alpha)P_t$, decreases, and the channel capacity decreases.

In this instance, according to an aspect of the present invention, the channel capacity of the primary user 120 may be calculated by considering the noise increase of the primary user 120 due to a channel estimation error and the sensing probability of the secondary user 220.

Equation 1 indicates that the channel capacity of the primary user 120 is 0 when the secondary user 220 receives and/or transmits a signal using the frequency resource of the primary base station 110 and the primary user 120. However, the channel capacity of the primary user may not necessarily be 0 when the secondary user 220 receives and/or transmits a signal using the frequency resource of the primary base station 110 and the primary user 120. That is, although an interference occurs in the primary user 120 due to the secondary user 220, the channel capacity of the primary user 120 may not be 0 and the primary use 120 may still use the frequency resource. Accordingly, when the interference occurring in the primary user 120 due to the secondary user 220 is 1, the channel capacity of the primary user 120 can be calculated as Equation 2:

$$C_{primary} = P_d(\alpha P_t)B\log_2\left(1 + \frac{(1-\alpha)P_t}{N_0 + E_{ch\_est}(\alpha)}\right) + \\ (1 - P_d(\alpha P_t))B\log_2\left(1 + \frac{(1-\alpha)P_t}{N_0 + E_{ch\_est}(\alpha) + I}\right). \quad \text{[Equation 2]}$$

Equation 1, described above, represents a channel capacity of a primary user 120 under the assumption that the primary user 120 cannot communicate when the secondary user 220 does not sense the pilot signal and receives and/or transmits a signal. Conversely, Equation 2 represents a channel capacity of a primary user 120 under the assumption that the primary user 120 can communicate although the secondary user 220 receives and/or transmits a signal while not sensing the pilot signal. However, an interference occurs in the primary user 120 due to the signal of the secondary user 220.

In this instance, $P_d(\alpha P_t)$ of Equation 1 and Equation 2 (i.e., the probability that the secondary user 220 senses the pilot signal) can be calculated as Equation 3:

$$P_d(\alpha P_t) = Q\left(Q^{-1}(P_{FA}) - \sqrt{\frac{N_2 \alpha P_t}{\sigma_{w2}^2}}\right)$$

$$Q(z) = \frac{1}{\sqrt{2\pi}} \int_z^\infty \exp\left(\frac{-x^2}{2}\right) dx,$$

[Equation 3]

where $P_{FA}$ is a false alarm probability that the secondary user 220 makes an erroneous determination with respect to an existence of the pilot signal despite no pilot signal, $N_2$ is a number of samples used by the secondary user 220 to sense the pilot signal, and $\sigma_{w2}^2$ is a power of Gaussian noise of the secondary user 220.

Accordingly, a pilot signal power control apparatus can predict $P_d(\alpha P_t)$, which is the probability that the secondary user 220 senses the pilot signal, depending on $\alpha$ through Equation 3. As a result, the channel capacity can be calculated using Equation 1 and Equation 2 based on the predicted $P_d(\alpha P_t)$. That is, a pilot signal power control apparatus can calculate the channel capacity by gradually increasing or decreasing $\alpha$, and a signal power control apparatus can predict $\alpha$ when the channel capacity is maximized.

Thus, according to aspects of the present invention, the power of the pilot signal can be determined so that the channel capacity based on the sensing probability of the secondary user 220 is maximized. In this instance, when the power of the pilot signal is determined, the power of the data signal can also be determined.

Also, according to aspects of the present invention, a channel capacity based on the channel estimation error of the primary user 120 may be calculated, and the power of the pilot signal can be determined so that the calculated channel capacity is maximized. That is, a receiving signal of the primary user 120 can be represented as Equation 4:

$$y = hx + hp + w$$ [Equation 4]

where y is a receiving signal, h is a channel between the primary user 120 and the primary base station 110, x is the data signal of the primary base station 110, p is the pilot signal of the primary base station 110, and w is noise.

When a channel estimated by the primary user 120 using the pilot signal is $\hat{h}$, a receiving signal excluding the pilot signal, y', can be represented as Equation 5:

$$y' = \hat{h}x + (h-\hat{h})x + w$$ [Equation 5]

where $(h-\hat{h})x$ denotes noise due to a channel estimation error of the primary user 120. In this instance, a mean square error of $(h-\hat{h})$ can change according to a channel estimation scheme. However, when assuming that a channel estimation is optimally performed, the mean square error of $(h-\hat{h})$ can be represented as Equation 6:

$$MSE = \frac{L\sigma_w^2}{N\alpha P_t},$$ [Equation 6]

where L is a number of channel taps, N is a number of samples used for the channel estimation from among pilot signals, and $\sigma_w^2$ is the power of the Gaussian noise of the primary user 120.

Accordingly, based on Equation 6, a noise increase occurring in the primary user 120 due to the channel estimation error of the primary user 120 can be calculated as Equation 7:

$$E_{ch\_est}(\alpha) = \frac{L\sigma_w^2}{N\alpha P_t}(1-\alpha)P_t,$$ [Equation 7]

Thus, according to aspects of the present invention, a noise increase with respect to the power of the pilot signal caused by a channel estimation error of the primary user 120 can be calculated. Accordingly, a channel capacity considering the noise increase caused by the channel estimation error of the primary user 120 and the sensing probability of the secondary user 220 can be calculated as Equation 8:

$$C_{primary} =$$

$$Q\left(Q^{-1}(P_{FA}) - \sqrt{\frac{N_2 \alpha P_t}{\sigma_{w2}^2}}\right) B \log_2\left(1 + \frac{(1-\alpha)P_t}{\sigma_w^2 + \frac{L\sigma_w^2}{N\alpha}(1-\alpha)}\right)$$

[Equation 8]

However, Equation 8 is represented based on Equation 1 (i.e., an equation with respect to a channel capacity generated based on Equation 2 is omitted). It is understood that aspects of the present invention are not limited to Equation 1.

As described above, according to aspects of the present invention, a noise increase caused by a channel estimation error of a primary user 120 based on the power of a pilot signal and the sensing probability of a secondary user 220 can be predicted. Moreover, the channel capacity of the primary user 120 can be calculated using the predicted noise increase and the sensing probability. As a result, the channel capacity corresponding to a sequentially increased or decreased power of the pilot signal can be calculated, and an optimal power of the pilot signal can be determined based on the calculated channel capacity.

Figure 3:
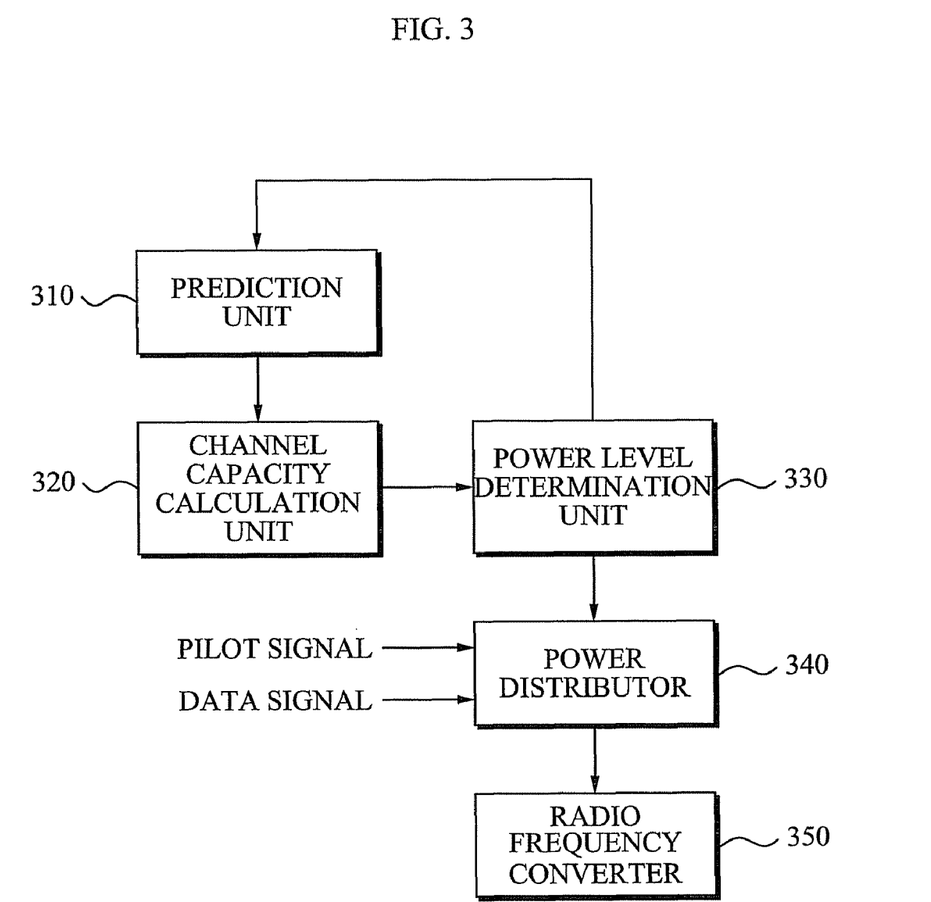
FIG. 3 illustrates a pilot signal power control apparatus according to an embodiment of the present invention.

FIG. 3 illustrates a pilot signal power control apparatus according to an embodiment of the present invention. Referring to FIG. 3, the pilot signal power control apparatus includes a prediction unit 310, a channel capacity calculation unit 320, a power level determination unit 330, a power distributor 340, and a radio frequency converter 350.

The prediction unit 310 predicts at least one of a noise increase and a sensing probability. The noise increase occurs in a primary user 120 due to a channel estimation error, and the sensing probability is a probability that a secondary user 220 senses a pilot signal of a primary network 100.

In this instance, the sensing probability of the secondary user 220 and/or the noise increase varies depending on the power of the pilot signal. Accordingly, the prediction unit 310 may predict the sensing probability of the secondary user 220 or the noise increase when a final power of the pilot signal is not determined and the power of the pilot signal has various values.

The channel capacity calculation unit 320 calculates a channel capacity of the primary user 120 based on at least one of the predicted noise increase and the sensing probability. In this instance, at least one of the noise increase and the sensing probability may be determined in advance to reduce an amount of calculations required.

Furthermore, the channel capacity calculation unit 320 may calculate the channel capacity of the primary user 120 according to a modulation coding scheme (MCS). For example, a minimum request signal to noise ratio, $P_t/\sigma_w^2$, can vary according to the MCS. The minimum request signal to noise ratio is requested by the primary user 120. Also, a minimum sensing signal to noise ratio $P_t/\sigma_{w2}^2$ where the secondary user 220 can sense the pilot signal can vary according to the MCS. Accordingly, the channel capacity calculation unit 320 may calculate the channel capacity corresponding to the varied MCSs, which is described in detail with reference to FIG. 4.

Moreover, the channel capacity calculation unit 320 may calculate the channel capacity by also considering an interference level occurring in the primary user 120 due to the secondary user 220. That is, as described in Equation 2, the primary user can communicate although the secondary user 220 receives and/or transmits a signal when the secondary user 220 does not sense the pilot signal. However, since the interference occurs in the primary user 120 due to a signal of the secondary user 220, the channel capacity calculation unit 320 may calculate the channel capacity further considering the interference level occurring in the primary user 120 due to the signal of the secondary user 220.

The power level determination unit 330 determines a power level of the pilot signal using the calculated channel capacity. Here, when the power level of the pilot signal increases, a power level of a data signal decreases. That is, the power level of the pilot signal and the power level of the data signal have an inverse relationship.

According to an aspect of the present invention, the power level determination unit 330 may determine the power level of the pilot signal so that the calculated channel capacity is maximized or is greater than a predetermined threshold value. That is, when the calculated channel capacity is not maximized or is equal to or less than the predetermined threshold value, the power level determination unit 330 may transmit an update signal to the prediction unit 310. In response to the update signal, the prediction unit 310 predicts at least one of the sensing probability and the noise increase corresponding to a power level of a pilot signal adjusted to be up to a predetermined level. Then, the channel capacity calculation unit 320 calculates the channel capacity considering the sensing probability and/or the noise increase corresponding to the power level of the pilot signal adjusted to the predetermined level. The operation as described above is repeated, and thus the power level determination unit 330 can determine an optimal power level of the pilot signal.

The power distributor 340 distributes power to each of the data signal and the pilot signal based on the determined power level of the pilot signal. For example, if is assumed that a total transmission power is 100 watts (W) and a ratio of the power of the pilot signal to a power of the data signal is 1:4, 20 W is allocated to the pilot signal and 80 W is allocated to the data signal.

The radio frequency converter 350 converts the pilot signal and the data signal into analog signals.

Figure 4:
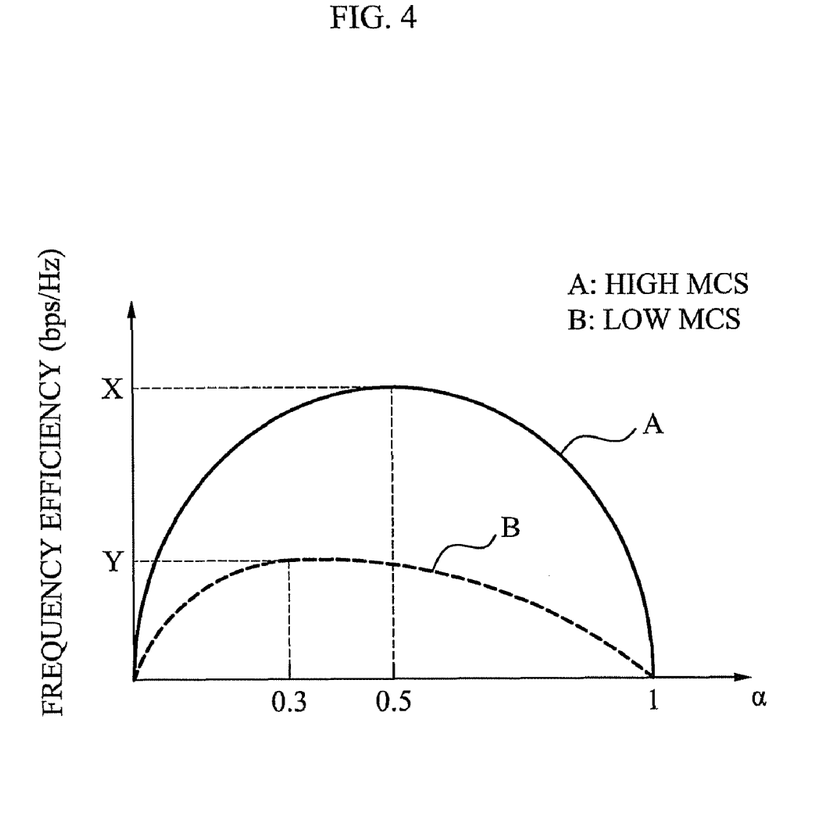
FIG. 4 illustrates a frequency efficiency with respect to a power level of a pilot signal according to a modulation coding scheme (MCS) according to an embodiment of the present invention.

FIG. 4 illustrates a frequency efficiency with respect to a power level of a pilot signal according to an MCS according to an embodiment of the present invention. Referring to FIG. 4, curve A indicates a frequency efficiency according to a power ratio of a pilot signal with respect to a total transmission power when a primary network 100 uses a high MCS (hereinafter, the power ratio of the pilot signal). Curve B indicates a power ratio of a pilot signal when a secondary network 200 uses a low MCS.

According to curve A, when the power ratio of pilot signal is 0.5, the frequency efficiency is X, which is a maximum for curve A. According to curve B, when the power ratio of pilot signal is 0.3, the frequency efficiency is Y which is a maximum for curve B. That is, according to an embodiment of the present invention, when the high MCS is used, the power ratio of the pilot signal can be maximized as 0.5. When the low MCS is used, the power ratio of the pilot signal can be maximized as 0.3.

Figure 5:
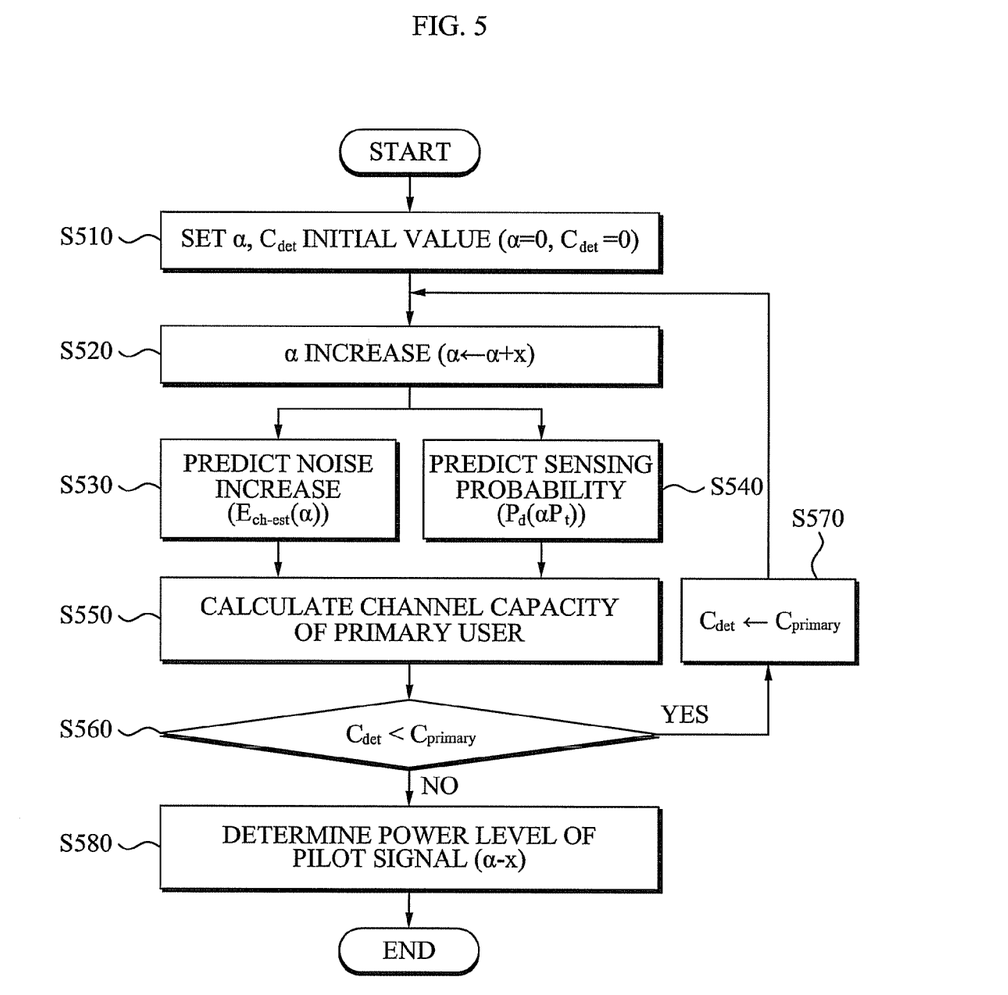
FIG. 5 illustrates an operation method of a pilot signal power control apparatus according to an embodiment of the present invention.

FIG. 5 illustrates an operation method of a pilot signal power control apparatus according to an embodiment of the present invention. Referring to FIG. 5, the pilot signal power control apparatus sets a power ratio of a pilot signal, $\alpha$, as 0, and the channel capacity ($C_{det}$) as 0 in operation S510.

In operation S520, the pilot signal power control apparatus sums $\alpha$ and a predetermined value x.

In operation S530, the pilot signal power control apparatus predicts a noise increase $E_{ch\_est}(\alpha)$ occurring in a primary user due to a channel estimation error. The noise increase $E_{ch\_est}(\alpha)$ may be predicted using Equation 7 described above.

In operation S540, the pilot signal power control apparatus predicts a sensing probability $P_d(\alpha P_t)$ of a secondary user 220. The sensing probability $P_d(\alpha P_t)$ may be predicted using Equation 3 described above.

Then, the pilot signal power control apparatus calculates a channel capacity of the primary user, $C_{primary}$, based on the noise increase $E_{ch\_est}(\alpha)$ and the sensing probability $P_d(\alpha P_t)$ in operation S550. The channel capacity of the primary user, $C_{primary}$, may be calculated using Equation 1 or Equation 2 described above.

The pilot signal power control apparatus compares $C_{det}$ and the channel capacity of the primary user, $C_{primary}$, in operation S560. If the channel capacity of the primary user, $C_{primary}$, is greater than $C_{det}$, a value of $C_{det}$ is replaced with the channel capacity of the primary user, $C_{primary}$, and stored in operation S570. Conversely, if the channel capacity of the primary user, $C_{primary}$, is equal to or less than $C_{det}$, a value obtained by subtracting x from a current $\alpha$ is determined as the power ratio of the pilot signal in operation S580.

Furthermore, after a value of $C_{det}$ is replaced with the channel capacity of the primary user, $C_{primary}$, and stored in operation S570, operations S520 to S570 are repeated, until the channel capacity of the primary user, $C_{primary}$, is equal to or less than $C_{det}$. The determined power ratio of the pilot signal may be a value that enables the channel capacity of the primary user to be maximized.

Aspects of the present invention can be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Furthermore, aspects of the present invention can be embodied in a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described aspects of the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A pilot signal power control apparatus to determine a power level of a pilot signal of a primary network in order to indicate an availability of a wireless resource of the primary network to a secondary user of a secondary network according to a cognitive radio technology, the pilot signal power control apparatus comprising:
    a prediction unit to predict a noise increase and/or a sensing probability, the noise increase occurring in a primary user of the primary network due to a channel estimation error, and the sensing probability being a probability that the secondary user senses the pilot signal of the primary network;
    a channel capacity calculation unit to calculate a channel capacity of the primary user based on the predicted noise increase and/or the predicted sensing probability; and
    a power level determination unit to determine the power level of the pilot signal using the calculated channel capacity.

2. The pilot signal power control apparatus as claimed in claim 1, wherein the power level determination unit determines the power level of the pilot signal so that the calculated channel capacity is maximized and/or is greater than a predetermined threshold value.

3. The pilot signal power control apparatus as claimed in claim 1, wherein the power level determination unit transmits an update signal to the prediction unit when the calculated channel capacity is not maximized or is equal to or less than a predetermined threshold value, and the prediction unit receives the update signal and predicts the sensing probability and/or the noise increase corresponding to a power level of the pilot signal that is adjusted to a predetermined level in response to the received update signal.

4. The pilot signal power control apparatus as claimed in claim 1, wherein the channel capacity calculation unit calculates the channel capacity of the primary user based on a modulation coding scheme of the primary network as well as the predicted noise increase and/or the predicted sensing probability.

5. The pilot signal power control apparatus as claimed in claim 1, wherein the channel capacity calculation unit calculates the channel capacity of the primary user based on an interference level occurring in the primary user due to the secondary user as well as the predicted noise increase and/or the predicted sensing probability.

6. The pilot signal power control apparatus as claimed in claim 1, wherein the noise increase and the sensing probability vary according to the power level of the pilot signal.

7. The pilot signal power control apparatus as claimed in claim 1, further comprising:
    a power distributor to distribute power to a data signal and the pilot signal according to the determined power level of the pilot signal.

8. The pilot signal power control apparatus as claimed in claim 7, further comprising:
    a radio frequency converter to convert the pilot signal and the data signal into analog signals.

9. A method of determining a power level of a pilot signal of a primary network in order to indicate an availability of a wireless resource of the primary network to a secondary user of a secondary network according to a cognitive radio technology, the method comprising:
    predicting a noise increase and/or a sensing probability, the noise increase occurring in a primary user of the primary network due to a channel estimation error, and the sensing probability being a probability that the secondary user senses the pilot signal of the primary network;
    calculating a channel capacity of the primary user based on the predicted noise increase and/or the predicted sensing probability; and
    determining the power level of the pilot signal using the calculated channel capacity.

10. The method as claimed in claim 9, wherein the determining of the power level comprises determining the power level of the pilot signal so that the calculated channel capacity is maximized and/or is greater than a predetermined threshold value.

11. The method of claim 9, wherein:
    the determining of the power level comprises transmitting an update signal when the calculated channel capacity is not maximized or is equal to or less than a predetermined threshold value; and
    the predicting of the noise increase and/or the sensing probability comprises receiving the update signal and predicting the sensing probability and/or the noise increase corresponding to a power level of the pilot signal that is adjusted to a predetermined level in response to the received update signal.

12. The method as claimed in claim 9, wherein the calculating of the channel capacity comprises calculating the channel capacity of the primary user based on a modulation coding scheme of the primary network as well as the predicted noise increase and/or the predicted sensing probability.

13. The method as claimed in claim 9, wherein the calculating of the channel capacity comprises calculating the channel capacity of the primary user based on an interference level occurring in the primary user due to the secondary user as well as the predicted noise increase and/or the predicted sensing probability.

14. The method as claimed in claim 9, further comprising:
    distributing power to a data signal and the pilot signal according to the determined power level of the pilot signal.

15. A computer-readable recording medium storing a program to implement a method of determining a power level of a pilot signal of a primary network in order to indicate an availability of a wireless resource of the primary network to a secondary user of a secondary network according to a cognitive radio technology, the method comprising:
    predicting a noise increase and/or a sensing probability, the noise increase occurring in a primary user of the primary network due to a channel estimation error, and the sensing probability being a probability that the secondary user senses the pilot signal of the primary network;
    calculating a channel capacity of the primary user based on the predicted noise increase and/or the predicted sensing probability; and
    determining the power level of the pilot signal using the calculated channel capacity.

* * * * *